Jan. 22, 1929.
Re. 17,200
M. B. REACH
METHOD OF MANUFACTURING BASEBALL CENTERS
Original Filed Sept. 3, 1924
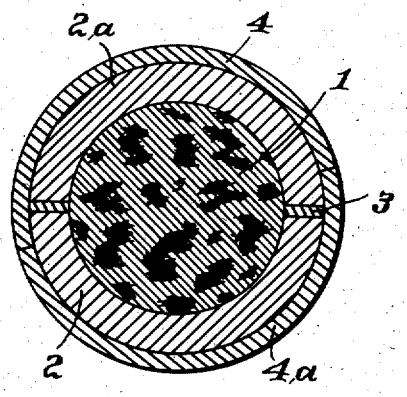
Inventor:
Milton B. Reach,
by Spear Middleton Donaldson & Hall
Attys.

Reissued Jan. 22, 1929.

Re. 17,200

UNITED STATES PATENT OFFICE.

MILTON B. REACH, OF CHICOPEE, MASSACHUSETTS, ASSIGNOR TO A. J. REACH CO., OF PHILADELPHIA, PENNSYLVANIA, A CORPORATION OF PENNSYLVANIA.

METHOD OF MANUFACTURING BASEBALL CENTERS.

Original No. 1,530,410, dated March 17, 1925, Serial No. 735,685, filed September 3, 1924. Application for reissue filed November 6, 1926. Serial No. 146,833.

My present invention concerns an improved method of making the resilient centers used in manufacturing baseballs.

The cork center baseball, as originally devised, has been the most popular playing ball of its kind. A fault has existed, however, that manifests itself in a certain percentage of balls turned out, due to the established process of molding, which operation consisted of forming two half spheres of uncured stock in one of which the cork center was deposited. The two halves were then fitted together and placed in a mold for molding. Under the heat and pressure of molding, the uncured stock flows, and it frequently happens that the cork center is distorted and displaced, with the result that the wound baseball, in which this center is used, is made untrue.

The present invention aims to avoid this objection and provide a method by which any and all irregularities in the cork center will be avoided and a uniform and perfect product be secured.

To this end the invention comprises the novel method hereinafter described and defined by the appended claims.

In order that my invention may be better understood, I have appended hereto a drawing in which:—

The figure shows the cork center with its enclosing shell, the different rubber portions which go to make up the rubber shell being indicated by lines of division, although it will be understood that in the completed and vulcanized article no division lines would appear, as the various rubber parts are, by the process of vulcanization, united into a homogeneous article, as will be well understood by those skilled in the rubber art.

Referring by reference characters to this drawing, the cork center is indicated by the numeral 1 and is of the character customarily used in the manufacture of baseballs of the type referred to. In making up my improved enclosing shell, I first mold two half spheres of rubber which are subjected in suitable molds having hemispherical cavities, to sufficient heat and pressure to vulcanize the rubber, the vulcanizing process being preferably discontinued just short of the complete curing stage, so that the sections, while not being completely cured, will yet have sufficient tenacity to cause them to retain their shape when subjected to the necessary heat to complete the vulcanization, as hereinafter described, and whereby any tendency to distortion or displacement will be avoided. The hemispheres are indicated at 2 and $2^a$ respectively, being duplicates of each other, and they are placed together to form the complete sphere with the cork center 1 enclosed thereby, and a thin washer of uncured gum placed between the abutting edges of the hemispheres, as indicated at 3. This washer is compounded of stock which will cure in a minimum amount of time, or specifically, in the amount of time and degree of heat required to complete the vulcanization of the hemispheres, which quickly curing characteristics can be secured by any of the well known methods familiar to those skilled in the art, as for example by the use of the so-called accelerators. After the hemispheres have been juxtaposed with the enclosed cork center and interposed washer, they are set within or enclosed by two half spheres of uncured rubber indicated at 4 and $4^a$, having an interior diameter corresponding to the exterior diameter of the hemispheres 2, and being made of a thickness not exceeding, and preferably slightly less, than that of the washer, and being made of the same rubber compound as the washer. The edges of the enclosing hemispheres 4 and $4^a$ abut as shown. Thereafter the assembled parts are placed within a mold of the usual type having a spherical mold cavity and submitted to the necessary heat in the ordinary vulcanizing press, the result of which is that the uncured washer and enclosing shell are softened and caused to "flow," as it is termed in the rubber art, whereby the yet uncured washer and enclosing hemispheres are homogeneously united and cured and also homogeneously united to the partially cured inner hemispherical sections, while at the same time, owing to the previous partial curing of the inner hemispherical sections, flowing or distortion of these is reliably prevented.

I thus secure a cork center enclosed in a homogeneous outer shell with the spherical contour of the cork center unchanged, and with the outer surface of the completed rubber sphere truly concentric to the surface of the cork sphere. It will be clear from the foregoing that the rubber washer and outer enclosing film are compounded to cure under the same heat and duration of time as is necessary to complete the cure of the inner hemisphere, and hence overcuring of any of the parts is prevented.

It is obvious that the extent of vulcanization of the sections may be varied, the point being that they are prevulcanized to cause them to retain their shape during assembly, and thereafter homogeneously joined together.

It is obvious in some cases the washer might be dispensed with and only the enclosing shells used, the pressure of the mold causing the rubber of the shells to flow into the line of junction of the hemispheres and fulfil the function of the washer. In some cases also the washer alone might be used, and the shells omitted.

Having thus described my invention, what I claim is:—

1. The hereindescribed method which consists in forming two hollow hemispheres of rubber compound, subjecting the same to vulcanization, enclosing a spherical cork center between said hemispheres, and securing them homogeneously together by vulcanization, with the aid of an interposed layer of quick curing rubber compound.

2. The hereindescribed method which consists in forming two partially cured hollow hemispheres of rubber, bringing these hemispheres together to enclose a spherical cork center with an uncured layer of relatively quick curing compound interposed between the juxtaposed edges of the hemispheres, and thereafter vulcanizing the article to cure the uncured layer and complete the cure of the hemispherical sections.

3. The hereindescribed method which consists in forming two partially cured hollow hemispheres of rubber, bringing these hemispheres together to enclose a spherical cork center with an uncured washer of relatively quick curing compound interposed between the juxtaposed edges of the hemispheres, enclosing the said assembly in an outer envelope of relatively thin uncured rubber compounded to cure in the same time as the aforesaid washer, and finally subjecting the whole to a vulcanizing action to vulcanize the washer and envelope and complete the vulcanization of the hemispheres.

4. The hereindescribed method of making playing ball centers, which consists in forming two hollow hemispheres of rubber compound, subjecting the same to vulcanizing action, enclosing a spherical cork center between said hemispheres, and homogeneously securing them together by causing a relatively quick curing rubber compound to flow in the space between the edges of the hemispheres and be vulcanized thereto.

5. The hereindescribed method which consists in forming two hemispheres of rubber compound, subjecting the same to partial vulcanization, enclosing a spherical cork center between said hemispheres, and securing them homogeneously together by vulcanization, with the aid of a quick curing rubber compound.

6. A baseball center comprising a spherical core of cork, a shell comprising two hemispheres of rubber holding said core and connected by vulcanization, and a rubber casing applied around the shell.

7. A baseball center comprising a spherical core of cork, a shell comprising two hemispheres of rubber holding said core, and a rubber washer interposed between the juxtaposed edges of said hemispheres and surrounding said core, said hemispheres and washer being connected by vulcanization.

8. The structure defined in claim 7 in further combination with a rubber casing applied around the shell and washer.

9. The herein described method of forming a homogeneous baseball center consisting in forming two hemispherical shells of a rubber compound vulcanized to a state just short of a complete cure, bringing the shells together under pressure about a spherical core with a connecting compound between the edges of the shells, and then subjecting the assembly to a vulcanizing action sufficient to complete the vulcanization of the shells.

10. The herein described method of forming a homogeneous baseball center consisting in providing two hemispherical shells of a rubber compound vulcanized to a state just short of a complete cure, bringing the shells together under pressure about a spherical core and with a quick curing rubber compound interposed between the juxtaposed edges of the shells, and then subjecting the assembly to a vulcanizing action sufficient to complete the vulcanization of the shells and effect vulcanization of the interposed compound.

11. The herein described method of forming a baseball center consisting in providing two hemispherical shells of a rubber compound vulcanized to a state just short of a complete cure, bringing the shells together about a spherical cork center with a quick curing rubber compound interposed between the juxtaposed edges of the shells, enclosing the assembly between two hemispherical shells formed of a quick curing rubber compound, and subjecting the whole to pressure and a vulcanizing action sufficient to complete the cure of the first named shells, and vulcanize the interposed compound and the two shells last named.

12. A baseball center assembly comprising a spherical core, two hemispherical shells of rubber enclosing the same, and two hemispherical shells of rubber enclosing the aforesaid assembly and connected by vulcanization at their juxtaposed edges.

13. A baseball center comprising a spherical cork center, two hemispherical shells of rubber enclosing the same and connected by vulcanization at their juxtaposed edges through an interposed compound different in character from that employed in the shells, and two hemispherical shells of rubber enclosing the aforesaid assembly and connected by vulcanization at the juxtaposed edges and interiorly to the periphery of the first named shells.

In testimony whereof I affix my signature.

MILTON B. REACH.